United States Patent [19]
Kinoshita et al.

[11] 3,945,454
[45] Mar. 23, 1976

[54] RADIATOR FOR A VEHICLE ENGINE

[75] Inventors: Isao Kinoshita, Iwata; Tosio Nagara, Toyota; Tosiro Kaziwara, Kariya, all of Japan

[73] Assignees: Yamaha Hatsudoki Kabushiki Kaisha, Iwata; Nippon Denso Co., Ltd., Kariya, both of Japan

[22] Filed: Feb. 26, 1975

[21] Appl. No.: 553,082

[30] Foreign Application Priority Data
Feb. 27, 1974 Japan................................ 49-23600

[52] U.S. Cl................ 180/68 R; 220/208; 220/210; 220/316
[51] Int. Cl.²......................................... B60K 11/02
[58] Field of Search............ 180/33, 68 R; 220/203, 220/208, 209, 210, 316; 70/168, 237

[56] References Cited
UNITED STATES PATENTS

| | | | |
|---|---|---|---|
| 2,990,971 | 7/1961 | Enell.................................. | 220/203 |
| 3,062,400 | 11/1962 | Humbert............................ | 220/203 |
| 3,086,677 | 4/1963 | Konchan............................ | 220/203 |

FOREIGN PATENTS OR APPLICATIONS

| | | | |
|---|---|---|---|
| 1,134,303 | 8/1962 | Germany............................ | 220/210 |

*Primary Examiner*—M. H. Wood, Jr.
*Assistant Examiner*—Terrance L. Siemens
*Attorney, Agent, or Firm*—Donald D. Mon

[57] ABSTRACT

The radiator comprises a radiator cap for closing a cooling medium supply port, valve means for permitting the interior of a radiator body to communicate with the open air, locking means operatively associated with the valve means and for locking the radiator cap to the radiator body, and a key for actuating the locking means, whereby the valve means is opened simultaneously with the time when the locking means has been unlocked by the key.

16 Claims, 6 Drawing Figures

RADIATOR FOR A VEHICLE ENGINE

BACKGROUND OF THE INVENTION

This invention relates to a radiator for a vehicle engine, and more particularly to a radiator for a water-cooled engine used in a motorcycle.

Generally, under a high temperature condition immediately after stopping the engine, when the radiator cap is removed from the filler neck of the radiator, the high temperature cooling medium or the vapor thereof is ejected from the cooling medium supply port of the filler neck due to the increased pressure within the radiator, followed by a great possibility of an operator being burned on the hand or other area.

For preventing a radiator cap disclosed in this, Japanese Utility Model Application Publication No. 46-7707, has been proposed. That radiator cap is provided with a valve for permitting the cooling medium supply port to communicate with the open air, and a release mechanism for releasing the radiator cap from the filler neck and opening said valve. In the case of this radiator cap, however, when removing it, the operator may directly touch said release mechanism while still hot. As the result, the operator runs the risk of being burned. Further more, since the radiator cap can be readily removed by anybody, there is the danger that it may be stolen by a miscreant particularly in case of a motorcycle whose radiator is in an exposed position.

SUMMARY OF THE INVENTION

The object of the invention is to provide a radiator having a safe and reliable cap which can be removed only by an unlocking operation performed with a the key followed by the valve release.

The radiator according to the invention comprises a radiator cap having valve means for permitting the radiator interior to communicate with the exterior, locking means for locking the radiator cap to the mouth portion of the radiator, and a key for positively opening the valve means at the time of unlocking the locking means.

Since, in the foregoing construction, the radiator cap can be removed from the radiator only by the key operation, there is no risk that the radiator cap will be stolen. Further more, while the valve means is positively opened by the key operation, yet the operator only indirectly touches the radiator cap through the key.

As a result, there is no fear of the operator being burned on the hand or any other place.

DETAILED DESCRIPTION OF THE EMBODIMENTS

Figure 1:
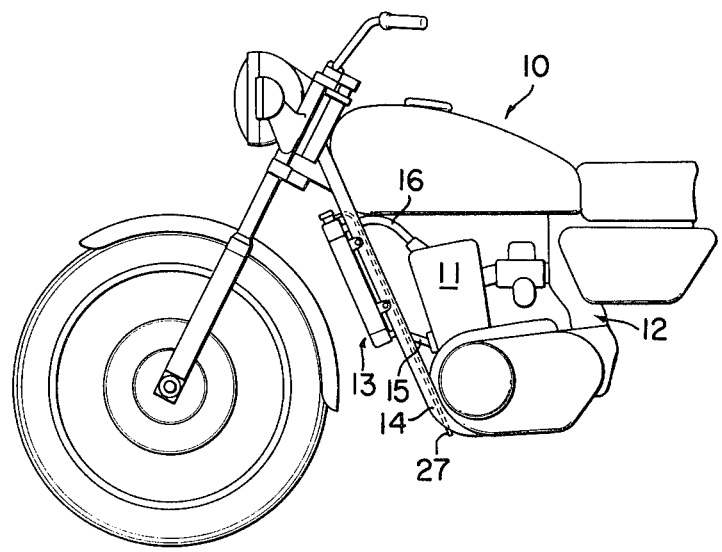
FIG. 1 is a side view illustrating the front part of a motorcycle provided with a radiator according to the invention.
Figure 2:
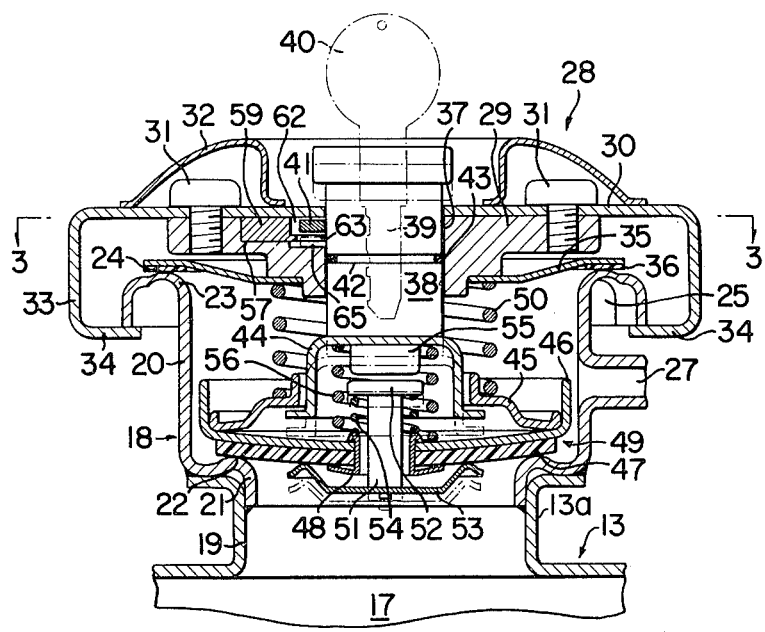
FIG. 2 is a longitudinal sectional view illustrating a radiator cap mounted on the radiator.

A motorcycle 10 illustrated in FIG. 1 comprises a water-cooled engine 11 fixed to a frame 12, and radiator 13 for cooling the engine 11. The radiator 13 is fixed to a down tube 14 of the frame 12, and permits the circulation of cooling medium such as water through a feed pipe 15, the engine 11 and a return pipe 16 in the order mentioned.

Referring to FIGS. 2 to 5, the radiator 13 according to the invention, as known, comprises a radiator body 13a having a chamber 17 for receiving the cooling medium. The radiator body has at its upper part a mouth portion or filler neck 18 forming a supply port for supplementarily supplying the cooling medium into the chamber 17 as required. The filler neck 18 has a tubular portion 19 integrally projecting upwardly of the radiator body 13a and a cylindrical member 20 welded to the tubular portion. The cylindrical member 20 has at its lower end an inwardly curved portion 21 forming a lower seat 22 and at its upper end an outwardly curved portion 23 forming a top seat 24. The outwardly curved portion 23 is formed with a pair of first notches 25 (See FIGS. 2 and 3) opposed to each other diametrically of the cylindrical member 20 and a second notch 26 (See FIGS. 3 and 4) angularly spaced from the first notches. Further, the cylindrical member 20 has an overflow pipe 27 communicating with the open air. The overflow pipe 27 extends in a direction in which it goes away from the filler neck 18, that is, extends downwardly along the down tube 14, and is opened at its lower end (See FIG. 1).

The radiator 13 has a radiator cap 28 removably attachable to the filler neck 18 in order to close the supply port. The cap 28 includes a cap body 29, a substantially circular cap plate 30 fixed by bolts 31 to the upper side of the cap body 29, and an annular ornamental member 32 semicircularly convexed in cross section which is welded to the upper side of the cap plate 30. The outer peripheral portion 33 of the cap plate 30 is bent downward and is formed at its lower end with a pair of tabs 34 bent inward in a manner diametrically opposed to each other. These tabs are fitted into the notches 25 when the radiator cap 28 is about to be fitted over the filler neck 18. To the underside of the cap body 29 is fixed a disk spring 35 having at the underside of its outer peripheral portion a seal member 36 formed of a suitable flexible material such as plastic. The disk spring 35 is so designed as to press the seal member 36 airtightly against the top seat 24 when the cap 28 is fitted over the filler neck 18.

The cap body 29 and the cap plate 30 are formed, respectively, with concentric holes constituting an interconnected cylindrical hole 37. Into the cylindrical hole 37 is fitted a known key cylinder 38 in such a manner that it is axially slidable by a prescribed amount and yet nonrotatable about its axis. The key cylinder 38 has a key hole 39 conformed with a key 40, for example, for a main switch of the engine, and a locking pin 41 rockable by the key 40 about the center axis of the cylinder 38. The outer peripheral wall of the key cylinder is formed with an annular groove 42 in which is set an O-ring 43.

The radiator cap 28 is provided with a pressure valve for preventing the interior pressure of the radiator chamber from exceeding a specified valve (which is greater than the atmospheric pressure) and a vacuum valve for preventing the interior pressure of the radiator chamber from being reduced to a value below a specified negative pressure. Explaining this in detail by reference to FIG. 2, an inverted cup-shaped member 44 whose lower edge portion is bent outward is fixed to the lower end of the key cylinder 38. Over the inverted cup-shaped member is loosely fitted a holding member 45, to the lower end of which is welded a circular plate 46. To the underside of the plate 46 is fixed by an eyelet 48 a seal member 47 formed of an appropriate flexible material such as plastic. The plate 46 and the seal member 47 constitute a pressure valve body 49. The pressure valve body is urged downward by a pressure valve spring 50, and when the radiator cap is fitted, is airtightly pressed against the lower seat 22. Into the hole through the eyelet 48 is loosely inserted a rod 51 having a flange 52 at its upper end. To the lower end of the rod 51 is riveted a vacuum valve body 53 consisting of a dish spring, said vacuum valve body being always urged against the seal member 47 by a vacuum valve spring 54 disposed between the flange 52 and the plate 46. To the inverted inner bottom of the inverted cup-shaped member 44 is fixed a pressing member 55 in such a manner that it is opposed to the upper end of the rod 51. Between the inverted cup-shaped member 44 and the plate 46 is disposed a compression spring 56, which acts to urge the inverted cup-shaped member 44 upwardly so that the key cylinder 38 is in an upwardly raised position when the radiator cap is fitted.

In the upper part of the cap body 29 is formed a recess 57, the side wall portions 58a, 58b of which form a guide extending substantially diametrically of the cap body. In the recess 57 is disposed a slider 59 having guide walls 60a, 60b slidably engaging the side wall portions 58a, 58b, so that the slider 59 can be moved from a solid line-indicated position to a chain line-indicated position of FIG. 3 and vice versa. On one end of the slider 59 is integrally formed a locking lug 61 movable from a locking position (indicated by solid lines of FIG. 4) at which it engages the second notch 26 of the outwardly curved portion 23 of the filler neck 18 to a release position (indicated by chain lines of FIG. 4) at which it disengages from the second notch 26 and vice versa. That portion of the slider 59 which faces the locking pin 41 of the key cylinder 38 is formed with an escapement depression 62 whose depth is slightly greater than the thickness of the locking pin 41, and a trapezoid notch 63 whose both sides form cam surfaces 64a, 64b. The locking pin 41 is situated within the escapement depression 62 or trapezoid notch 63 in accordance with the axially moved position of the key cylinder 38. In the bottom of the recess 57 of the cap body 29 is formed a sectorial depression 65 which is located below the trapezoid notch 63. The sectorial depression 65 has stop surfaces 66a, 66b for limiting the rocking movement of the locking pin 41, and its depth is smaller than the thickness of the locking pin 41.

Figure 3:
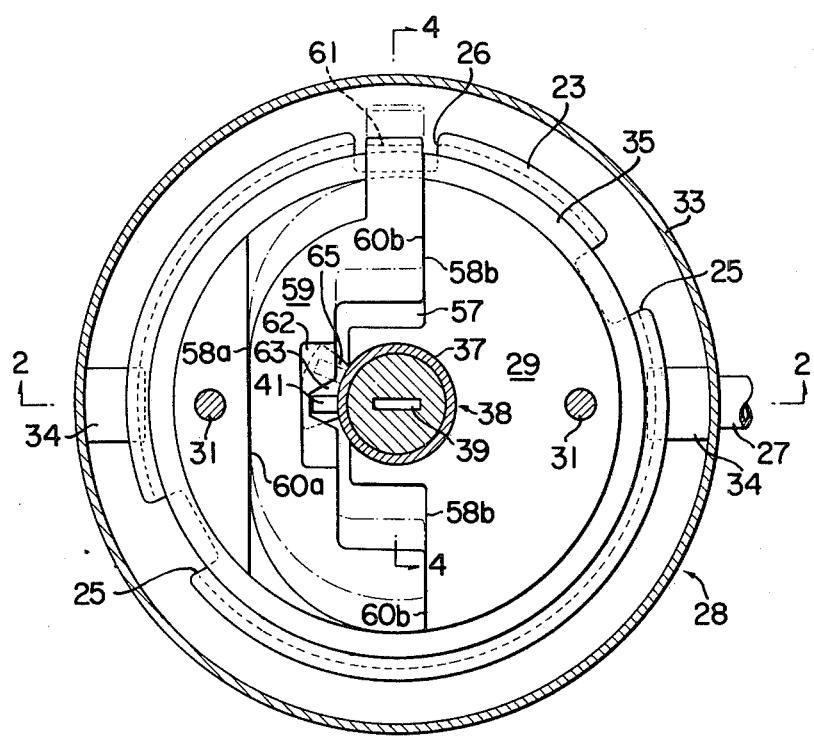
FIG. 3 is a cross sectional view taken along the line 3—3 of FIG. 2.
Figure 4:
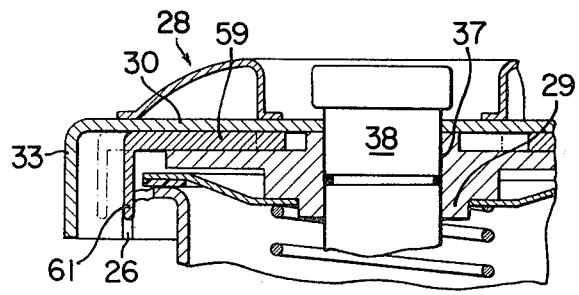
FIG. 4 is a longitudinal sectional view taken along the line 4—4 of FIG. 3.
Figure 5:
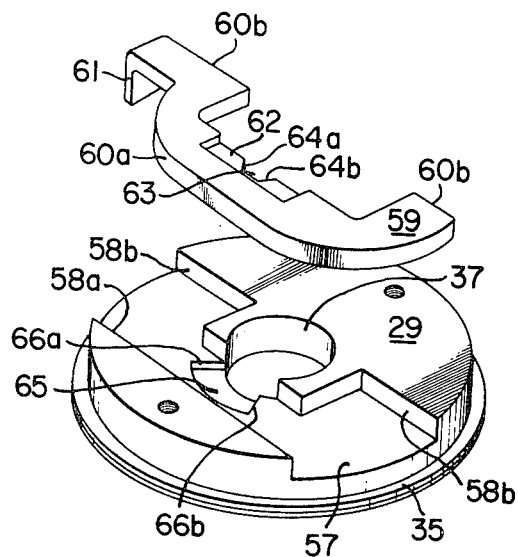
FIG. 5 is an exploded view illustrating the slider and radiator cap body of FIG. 2.

Under the condition in which the radiator cap 28 is removed from the filler neck 18 of the radiator 13, the slider 59 is in the chain line-indicated position of FIG. 3 to keep the locking lug 61 at the chain line-indicated release position of FIG. 4. When the radiator cap 28 is fitted over the filler neck 18 of the radiator 13, the cap tabs 34 are first inserted from above into the first notches 25 of the outwardly curved portion 23 to cause the disk spring 35 and the seal member 36 to abut against the top seat 24. Simultaneous with this abutment, the pressure valve body 49 is pressed against the lower seat 22 by the spring 50 while the key cylinder 38 is relatively pushed upward by the compression spring 56 so as to cause the locking pin 41 to escape from the trapezoid notch 63 and enter the escapement depression 62. The upward movement of the key cylinder 38 may be limited by engagement of the locking pin 41 with the cap plate 30, or may be limited by other stop means.

When the radiator cap 28 is rotated, the tabs are pressed against the lower edge of the outer periphery of the outwardly curved portion 23 by the biasing force of the disk spring 35 so as to prevent the cap 28 from coming away upwardly from the filler neck 18. Rotation of the cap 28 is performed until the locking lug 61 of the slider 59 is aligned with the second notch 26 of the outwardly curved portion 23. Aligning of the lug 61 with the notch 26 may be carried out through indicating the alignment position by placing, for example, an arrow mark on the cap 28, or may be carried out through separately providing stop means.

When the key 40 is inserted into the key hole 39 and is pushed downward to push the key cylinder 38 down against the biasing force of the compression spring 56, the locking pin 41 moves from the escapement depression 62 into the trapezoid notch 63 and then into the sectorial depression 65, and simultaneously the pressing member 55 pushes the rod 51 down to open the vacuum valve. When, under this condition, the key 40 is rotated counter-clockwise (FIG. 3), the locking pin 41 is brought into engagement with the cam surface 64b of the trapezoid notch 63 to move the slider 59 up to the solid line-indicated position of FIG. 3. At this time, the locking lug 61 enters the second notch 26 of the outwardly curved portion 23 to prevent the radiator cap 28 from being rotated any further this position being shown by (the solid line-indicated position of FIG. 4). The stop surface 66b of the sectorial depression 65 prevents the locking pin 41 from being rotated to far. When the key 40 is drawn out, the key cylinder 38 is pushed upward by the spring 56 to cause the locking pin 41 to be brought back into the escapement depression 62.

If, when performing the locking operation, the key 40 is rotated without depressing the key cylinder 38, the locking pin 41 will be idly rotated within the escapement depression 62 to causing no movement of the slider 59.

If while the cap 28 is fitted to the filter neck, the interior pressure of the radiator chamber 17 exceeds its specified limit, the pressure valve body 49 is pushed upward against the biasing force of the pressure valve spring 50 to cause the interior pressure of the radiator chamber to escape into the overflow pipe 27. Furthermore, when the interior pressure of the radiator chamber 17 exceeds its specified negative pressure limit, for example, due to the radiator being cooled, the vacuum valve body 53 is lowered against the biasing force of the vacuum valve spring 54 to cause the cooling medium to be introduced into the radiator chamber through the overflow pipe.

When it is desired that the radiator cap 28 be removed, the key 40 is first inserted into the key hole 39 and then the key cylinder 38 is depressed. This causes the pressing member 55 to push the rod 51 of the vacuum downward to cause the interior pressure of the radiator chamber 17 to escape into the overflow pipe 27. Subsequently, when the locking pin 41 is rotated by the key 40, the slider 59 is moved up to the chain line-indicated position of FIG. 3 to cause the locking lug 61 to be brought to the release position (indicated by the chain lines of FIG. 4). This causes the radiator cap 28 to be rendered rotatable so as to be removed from the filler neck 18. The stop surface 66a imposes a limitation upon the clockwise rotation movement of the locking pin 41.

Unless, when performing the unlocking operation, the key cylinder 38 is depressed, the locking pin 41 is idly rotatable within the escapement depression 62, failing to complete the unlocking operation. Where, accordingly, it is desired that the locking lug 61 to be brought to the release position, it is unavoidably necessary to depress the key cylinder 38 (this depression is followed by the release of the vacuum valve).

Figure 6:
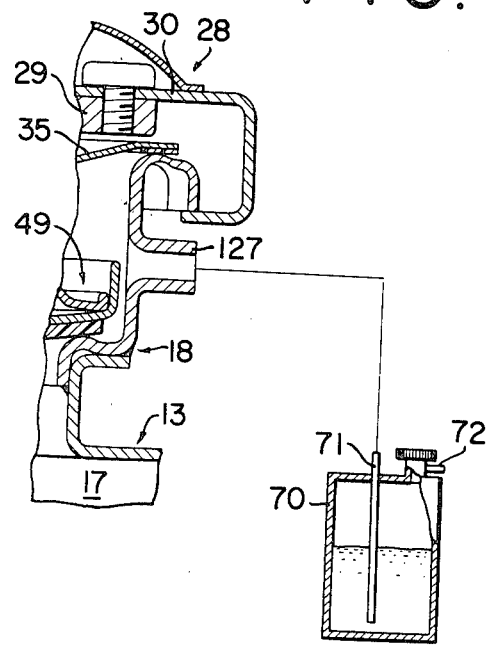
FIG. 6 is a longitudinal sectional view illustrating partially a modification of the radiator according to the invention.

In FIG. 6, the same parts and sections as those of the preceding embodiment are denoted by the same reference numerals. An overflow pipe 127 of this modification is connected to a pipe 71 extending up to the bottom of a reserve tank 70 communicating with the open air through an outlet 72. In this construction, the vapor of the cooling medium coming from the radiator 13 is liquefied within the reserve tank 70 and stored therein. When the interior pressure of the radiator becomes negative, the cooling medium thus liquefied is returned to the radiator interior through the overflow pipe 127. Therefore, the amount of cooling medium consumed is decreased, hence supplemental addition to the cooling medium is not required to any great extent.

What we claim is:

1. A radiator for a vehicle engine comprising a radiator body having a mouth portion forming a cooling medium supply port, a radiator cap for closing said cooling medium supply port, said mouth portion having passage means to permit said cooling medium supply port to communicate with the open air, valve means for normally closing said passage means, locking means for locking said radiator cap to said mouth portion and operatively associated with said valve means so as to compulsively open said valve means irrespective of the interior pressure level of said radiator, and a key for actuating said locking means.

2. A radiator according to claim 1, wherein said locking means includes a mechanism for opening said valve means when said locking means has been depressed.

3. A radiator according to claim 1, wherein said locking means includes a mechanism for opening said valve means when said locking means is unlocked by said key.

4. A radiator according to claim 3, wherein said mechanism has a key cylinder axially slidably with respect to said radiator cap, said key cylinder being arranged to open said valve means when depressed.

5. A radiator according to claim 4, wherein said valve means includes a pressure valve which opens when the interior pressure of said radiator has exceeded a first reference pressure, and a vacuum valve which opens when the interior pressure of said radiator has been reduced to a level below a second reference pressure, said key cylinder being arranged to open said vacuum valve when depressed.

6. A radiator according to claim 4, wherein said key cylinder has a locking pin rotatable by said key; and said locking means further includes a slider operated by a combined operation of the key cylinder depressing operation and the locking pin rocking operation, and a locking lug movable between a locking position and a release position in accordance with the slider operation.

7. A radiator according to claim 6, wherein said slider has surfaces engageable with said locking pin only when said key cylinder has been depressed.

8. A radiator according to claim 7, wherein said locking means has a spring for urging said key cylinder upwardly; and said slider is formed with an escapement depression for normally receiving therein said locking pin so as to cause it to be rotatable back and forth freely.

9. A radiator according to claim 6, wherein said radiator cap has stop surfaces for limiting the amount of rocking rotatable movement of said locking pin.

10. A radiator according to claim 6, wherein said valve means includes a pressure valve which opens when the interior pressure of said radiator has exceeded a first reference pressure, and a vacuum valve which opens when the interior pressure of said radiator has been reduced to a level below a second reference pressure, said key cylinder being arranged to open said vacuum valve when depressed.

11. A radiator according to claim 10, wherein said passage means has an exhaust port at a position spaced from said cooling medium supply port.

12. A radiator according to claim 10, wherein said passage means is connected to a reserve tank for liquefying a vaporized portion of said cooling medium.

13. A radiator cap for closing the mouth of a supply port of a vehicle engine radiator of a type having a lower valve seat and an upper valve seat, said cap comprising:
    a cap body;
    a spring-biassed seal member attached to the body and adapted to bear downward against the upper seat;
    a key cylinder through the body which is slidable relative to the body;
    pressure valve means loosely fitted at the bottom of said key cylinder;
    first spring-biassed means adapted to urge said pressure valve means to seat against said lower valve seat;
    a vacuum valve body movable toward and away from the lower side of said pressure valve means;
    second spring-biassed means urging said vacuum valve body into contact with said lower side of said pressure valve means; and
    means for attaching said cap body to the mouth of the supply port.

14. A radiator cap according to claim 13 in which the means for attaching said cap body to the mouth of the supply port tab means is adapted to engage said mouth.

15. A radiator cap according to claim 13 including a locking pin attached to the key cylinder and rotatable back and forth through an angle by means of key inserted downwardly into the key cylinder.

16. A radiator cap according to claim 15 in which the cap body contains a recess and including a slider slidable back and forth in the recess, said slider having a locking lug which locks to the filter mouth in one position of the slider and unlocks in another position of the slider, said slider having an escapement depression and a notch at the escapement depression, said notch having cam surface means, said recess containing a depression below the notch of the slider, said locking pin being normally positioned within the notch so that turning the key causes the slider to slide to the locking position or to the unlocking position of its lug, said pin being depressible against the force of the spring of said first spring-biassed means, into the depression of the cap body where it may be rotated to a position beneath the slider.

* * * * *